June 4, 1968

C. L. AUDOIN ETAL  3,387,241
PERMANENT MAGNET MULTIPOLE MAGNETIC LENS
WITH VARIABLE CONVERGENCE

Filed Oct. 11, 1966

INVENTORS:
Claude L. AUDOIN and
Albert L. SEPTIER

BY: *A. A. Saffitz*

Attorney

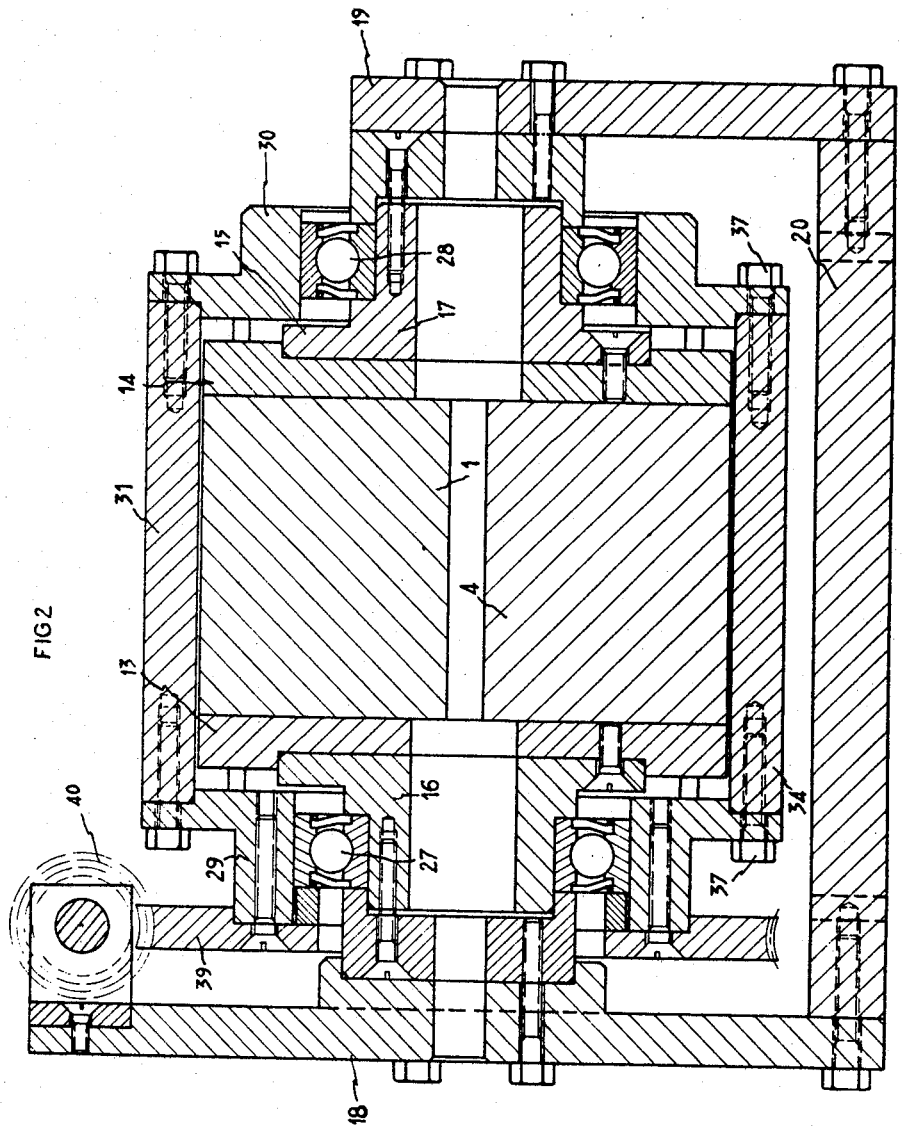

United States Patent Office 3,387,241
Patented June 4, 1968

3,387,241
PERMANENT MAGNET MULTIPOLE MAGNETIC LENS WITH VARIABLE CONVERGENCE
Claude L. Audoin, Ivry-sur-Seine, and Albert L. Septier, Bourg-la-Reine, France, assignors to Centre National de la Recherche Scientifique, Paris, France, a body corporate of France
Filed Oct. 11, 1966, Ser. No. 585,937
3 Claims. (Cl. 335—210)

ABSTRACT OF THE DISCLOSURE

Multipole permanent magnet lens comprising an even number 2N of elongated cylindrical pole pieces alternately North and South, equiangularly distributed around an axis and each having a substantially hyperbolic profile inscribed within an angle $2\pi/2N$ and a heel portion remote from the axis. The heel portions of the pole pieces are connected to one another by permanent magnets disposed substantially orthoradially, the poles of which magnetize the pole pieces alternately North and South. A ring comprising alternate sectoral magnetic and non-magnetic portions can rotate around the heel portions and be immobilized in a selected position.

---

The present invention relates to a magnetic lens for focusing particles and more particularly to a multiple magnetic lens with a non-homogeneous field pattern of the type characterized by a constant radial gradient or in which the radial gradient is a simple analytical function of the radial distance.

Multiple magnets are known in the prior art which consists of a plurality of straight cylindrical poles which are alternately North and South, placed around and at an equal distance from a common axis, and having a symmetry of rotation of a given order. It is likewise known that the variation, as a function of the distance to the axis, of the radial gradient of the field pattern obtained with such multipole magnetic lenses depends on the order of the symmetry of rotation. The gradient is constant for quadrupole lenses and proportional to the polar radius for sexquipole lenses, i.e. the transverse magnetic field is respectively proportional to the radius and to the square of the radius. The coefficients of higher orders of magnitude of the powers of the radius in the expression of the field are lower as the profile of the poles approaches a theoretical curve which is a branch of an equilateral hyperbola in the case of a quadrupole lens and more generally a branch of a curve that takes on the appearance of a hyperbola whose asymptotes form with each other an angle equal to $2\pi$ divided by the order of symmetry of rotation.

Multipole magnetic lenses are either electromagnet or permanent magnet lenses.

Multipole electromagnet lenses have a controllable convergence through variation of the intensity of the current going through the coils of the electromagnets. Unfortunately for certain applications (focusing of atomic beams, for example), this type of lens is very cumbersome for a given convergence, thus requiring either the construction of voluminous vacuum enclosures containing the lens which then provokes delicate technological problems: insulation of conductors which do not suitably degass under vacuum, cooling of coils under vacuum, or evacuating the only useful region of the air gap which is essentially a straight circular cylinder whose radius is that of the circle defining the neck of the lens. It becomes therefore necessary to use a tube whose radius is sufficiently large so that the pumping speed in it remains large enough and this solution which causes decrease in the volume of the vacuum enclosure causes an increase with respect with the first mentioned solution, of the bulkiness and weight of the electromagnet, as well as the electric power that it requires. Furthermore, a considerable stabilization of the current supply is necessary which is another delicate problem due to the strong currents used.

The permanent magnet multipole lenses give magnetic fields of great stability. Bulkiness is considerably reduced which makes it possible to miniaturize the lenses and devices used in focusing the atomic beams. Unfortunately, convergence is set and correction in the course of experimentation is no longer possible.

The object of the invention is to provide a permanent magnet multipole magnetic lens with variable convergence.

A further object of the invention is to provide a permanent magnet multipole magnetic lens having means for varying the lens convergence while the lens is experimented.

The multipole magnetic lenses of the invention are advantageous in that they are characterized simultaneously by low bulkiness, long term stability of the permanent magnet lenses and the possibility of convergence control.

According to the invention, the multipole magnetic lens consists of an even number 2N of elongated cylindrical pole pieces alternately North and South, equiangularly distributed around an axis and each having a substantially general hyperbolic profile inscribed within an angle $2\pi/2N$, and limited by a heel located at a certain distance from the axis, non-magnetic flanges perpendicular to the axis holding in place said pole pieces, permanent elongated magnets having an orthoradial direction and placed between the heels of two successive pole pieces, their poles being oriented so as to alternately magnetize North and South the pole pieces, a ring comprising alternate portions made from magnetic material and from non-magnetic material, the first ones constituting with the permanent magnets, and depending upon the angular position of the ring, an open magnetic circuit or a more or less closed magnetic shunt and means for rotating and immobilizing said ring in a selected position. This results in the fact that the absolute value of the field in the air gap of the lens and subsequently the convergence of the latter depends on the angular position of the ring, without the shape and symmetry of the field distribution within the useful zone being affected.

The invention will now be described in detail referring to the attached drawings in which:

FIG. 2 is an axial section of this lens, and

Referring to FIGS. 1 and 2, 1 to 6 represent cylindrical pole pieces made from a high permeability magnetic material such as soft iron, the profile of each of these pieces being inscribed within an angle of $2\pi/6$. Theoretically, in order for the magnetic field to vary directly with the square of the radial distance, the profile of a pole must be given by the equation:

$$r^3 \cos 3\theta = r_0^3$$

in which $r$ is the polar radius, $\theta$ is the polar angle and $r_0$ is a constant equal to the radius of the circle defining the neck of the lens.

The magnetic potential $V$ in each sextant is given by the relationship:

$$V/V_0 = (r/r_0)^3 \cos 3\theta$$

where $V_0$ represents the magnetic potential of the corresponding pole.

Figure 1:
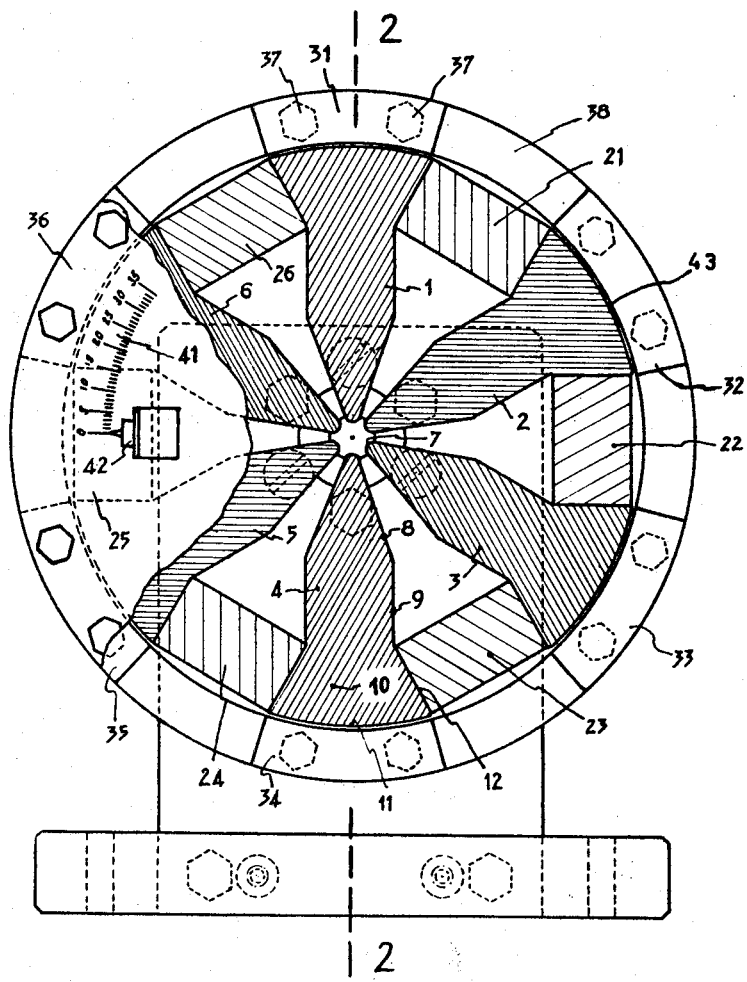
FIG. 1 is a cross-sectional view of the multipole magnetic lens of the invention in the case in which the latter has six poles.
Figure 3:
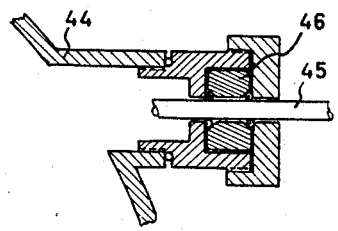
FIG. 3 shows a shaft seal for the control of focusing.

It is possible, while allowing the introduction into the expression $V/V_0$ of a certain number of sine or cosine functions of the argument $(2n+1)3\theta$ ($n$ is an integer) which are of practically negligible significance, to impart to the pole profiles the one represented in FIG. 1 in which the extremity of each pole is circular at 7 and then shows a part which is shaped in the form of a dihedron or prism 8, and then a parallelepipedic part 9 and finally a new part in the form of a dihedron or prism 10. The back part of the heel of each pole is bound by a circular cylinder 11. The bell mouth 10 is conceived so that the sides 12 of the heels of two consecutive poles are parallel. However this shape although it is preferable and of special value because it allows for the use of simply shaped permanent magnets, is not obsolutely necessary. Between the sides 12 are permanent magnets 21–26 shaped in the form of parallelepipeds as of Ticonal, magnetized in such a way that on the circle around the axis of the lens, there are successively two North poles and two South poles and so on.

The cylindrical poles are fixed to two flanges 13 and 14 punctured at the center, and themselves fixed to the flange 15 of two hollow cylindrical members 16 and 17. These cylindrical members are fixed to uprights 18 and 19 of a frame 20. They serve as supports for ball bearings 27 and 28 on which are brought to bear flanges 29 and 30 of a magnetic shunt carrying ring. These magnetic shunts 31–36 are shaped in the form of cylindrical sectors and their number is equal to that of the poles. Each one has an angular development which is at least equal to the interval between two successive magnets. The magnetic sectors are fixed to flanges 29 and 30 by four screws 37, which makes it possible to fix shunts having different angular developments to the ring. The intervals 38 between the magnetic sectors are empty.

In the field of focusing charged particle beams or neutral polarized particle beams, the magnetic field at the top of a pole has a high strength, for example 1 Tesla, and the length of the lens is of the order of 15 cms. These are quite different values from those used in the field of focusing and deflecting low energy electron beams in cathode ray tube magnetic lenses in which the field is of the order of 4 10$^{-2}$ Tesla and the lens length of the order of 2 cms. It results that the magnetic shunt carrying ring cannot be easy fitted around the lens in which case it would be immobilized by field attraction but must be separated by a gap 43 of say 0.5 mm. from it.

The permanent magnets exert a strong attraction upon the magnetic shunt, and in order for the magnetic shunt carrying ring to remain locked in the position in which it has been set, the ring driving means must be irreversible.

The ring is rotated by means of a worm gear 40 meshing with a worm wheel 39 fixed onto the ring. The worm wheel is graduated at 41 and an index 42 is fixed to one of the frame uprights.

The lens is mounted inside a vacuum chamber 44 (FIG. 3) and the shaft 45 of worm gear 40 crosses the chamber wall through a vacuum tight shaft seal 46 allowing rotary motion. The O-rings of the seal are made of low vapor pressure, resilient material such as Neoprene, Myvaseal and Viton (fluorovinylidene hexafluoropropylene copolymer).

The variable focal length lens of the invention makes it possible to reduce considerably the preliminary settings which are necessary in order to determine the focal point of atoms that are in given internal state. Focusing depends, among other factors, on the velocity of atoms entering into the lens and this velocity changes each time the geometry of the exit channel of the gas tank is modified, more particularly when supersonic nozzles are used for which the calculation of the exit velocity is practically impossible with any degree of accuracy.

What we claim is:

1. A multipole magnetic lens comprising an even number 2 N of elongated cylindrical pole pieces, alternately North and South, equiangularly distributed around an axis and each having a substantially general hyperbolic profile inscribed within an angle $2\pi/2N$, and bound by a heel located at a certain distance from the axis, non-magnetic flanges perpendicular to the axis holding in place said pole pieces, elongated permanent magnets having an orthoradial direction and placed between the heels of two successive pole pieces, their poles being oriented so as to magnetize the pole pieces alternately North and South, a ring comprising first alternate magnetic sectoral portions and second non-magnetic sectoral portions, the first portions constituting with the permanent magnets and depending upon the angular position of the ring an open magnetic circuit or a substantially closed magnetic shunt, and means for rotating said ring and immobilizing it in a selected position.

2. A multipole magnetic lens according to claim 1 in which the substantially hyperbolic profile comprises a first circular part in the vicinity of the lens axis, a second part in the form of a dihedron, a third part in the form of a parallelepiped and a fourth part in the form of a dihedron.

3. A multipole magnetic lens according to claim 2 in which the second dihedrons of two adjacent polar pieces have parallel faces and permanent magnets are parallelepiped-shaped and inserted between said parallel faces.

References Cited
UNITED STATES PATENTS
2,305,761   12/1942   Borries et al. _ _ _ 250—49.5 XR BERNARD A. GILHEANY, *Primary Examiner.*

GEORGE HARRIS, JR., *Examiner.*